United States Patent [19]

Bergan et al.

[11] Patent Number: 5,747,746
[45] Date of Patent: May 5, 1998

[54] RESTRAINT SYSTEM FOR WEIGHT SCALES

[75] Inventors: Terry Bergan; Dwaine Friesen, both of Saskatchewan, Canada

[73] Assignee: International Road Dynamics, Inc., Saskatchewan, Canada

[21] Appl. No.: 584,401

[22] Filed: Jan. 11, 1996

[30] Foreign Application Priority Data

Oct. 12, 1995 [CA] Canada .................. 2160418

[51] Int. Cl.[6] ........................... G01G 21/23
[52] U.S. Cl. .................. 177/134; 177/184; 177/154; 177/263
[58] Field of Search ................ 177/134, 262, 177/263, DIG. 9, 154, 155, 156, 184, 187, 189

[56] References Cited

U.S. PATENT DOCUMENTS

| | | | |
|---|---|---|---|
| 3,354,973 | 11/1967 | Farquhar | 177/134 |
| 4,064,955 | 12/1977 | Dyck | 177/134 |
| 4,386,671 | 6/1983 | Dyck | 177/208 |
| 4,765,423 | 8/1988 | Karpa | 177/211 |
| 4,899,840 | 2/1990 | Boubille | 177/187 X |
| 5,096,007 | 3/1992 | Burkhard | 177/187 X |
| 5,600,104 | 2/1997 | McCauley et al. | 177/136 |

FOREIGN PATENT DOCUMENTS 1173069  8/1984  Canada .

*Primary Examiner*—Michael L. Gellner
*Assistant Examiner*—Randy W. Gibson
*Attorney, Agent, or Firm*—Nixon & Vanderhye PC

[57] ABSTRACT

A securing system is provided for securing a central, load-supporting, movable platform to a fixed peripheral framework base of a weigh scale, in a torque arm mounting for weigh scales. The securing system includes at least one securing element disposed between the central inner movable load-supporting platform constituted by inner upper and inner lower platforms, between the outer lower frame member and the fixed peripheral mounting frame. Aligned-through holes pass through the central inner lower platform and the outer lower frame member. A dead-end cylindrical bore extends from the upper face of the inner upper platform. A compression spring is seated within such dead-end cylindrical bore. A hole pierces the bottom of the dead-end cylindrical bore. A third aligned through-hole passes through the compression spring. A securing bolt extends concentrically through the three aligned through-holes, and the compression spring and is threadably secured to the mounting frame.

7 Claims, 3 Drawing Sheets

1

RESTRAINT SYSTEM FOR WEIGHT SCALES

BACKGROUND OF THE INVENTION

(a) Field of the Invention

This invention relates to weigh scales. More particularly, it relates to restraint systems for interconnecting the fixed mounting frame of this scale, the fixed outer peripheral frame of the scale, and the central movable platform of such weigh scales. More specifically, but not exclusively, it relates such improvements for weigh-in-motion scales.

(b) Description of the Prior Art

As noted above, weigh scales have traditionally included a fixed outer peripheral frame secured to a mounting frame, a fixed outer peripheral frame, and a central movable platform connected to the peripheral framework and to a load cell which could translate vertical movement of the central movable platform with respect to the fixed outer peripheral frame into a measure of the weight on the platform.

Many patents show connecting the platform to the base of such scales. U.S. Pat. No. 3,354,973 issued Nov. 28, 1967 to J. C. Farquhar illustrates one typical mechanism. Other typical mechanisms were provided, e.g. by Dyck in U.S. Pat. No. 4,064,955 issued Dec. 27, 1977; by Dyck in U.S. Pat. No. 4,386,671 issued Jun. 7, 1983; and by Dyck in Canadian Patent No. 1,173,069 patented Aug. 21, 1984. Yet in all those patents little attention was given to the exact physical structure of the securement means between the fixed, peripheral frame base structure and the central, movable, load-supporting platform. The prior art merely referred to bolts engaging internally threaded holes and through ports.

SUMMARY OF THE INVENTION

(a) Aims of the Invention

Accordingly it is an object of this invention to provide an improved restraint system for connecting the central, movable platform to the fixed outer peripheral frame and to the mounting frame of such weigh scales.

(b) Statement of Invention

This invention provides such a securing system which includes a plurality of cooperative securing elements disposed between the central inner movable scale platforms constituted by inner upper and inner lower platforms, the outer frame member and the fixed peripheral mounting frame. The securing elements comprise a dead-end cylindrical bore extending from the upper face of the central inner upper movable, scale platform. A compression spring is seated within such dead-end cylindrical bore. A hole pierces the bottom of the dead-end cylindrical bore. An aligned through-hole passes through the central, inner, lower platform. An aligned through-hole passes through the outer, lower, frame member. A securing bolt extends concentrically through the compression spring, the hole in the central, inner, lower movable scale platform, and through the through-hole in the outer lower frame member. Finally, means provided for threadedly securing the securing bolt to the mounting frame.

(c) Other Features of the Invention

By one feature thereof, the central, inner, upper platform, the central, inner, lower platform, the outer, upper, frame member, and the outer, lower, frame member, are all interconnected by a torque arm mounting structure.

By another feature thereof, the scale includes an outer, upper, frame member and outer, lower, frame member, and a plurality of bearing pads disposed between the outer, lower, frame member and the mounting frame.

By yet another feature thereof, a mounting pad is fixed to the mounting frame, and the securing bolt is threadedly attached to such mounting pad.

By still another feature thereof, the head of the securing bolt is covered by a sealing cap including a peripheral O-ring for engagement with the interior wall of the dead-end cylindrical bore. In another feature of such feature, the entry to the bore is covered by a frost plug seal.

By yet another feature, the base of the outer lower frame member is sited with respect to the mounting frame by a plurality of transversely-extending, anti-slide plates.

BRIEF DESCRIPTION OF THE DRAWINGS

In the accompanying drawings.

DESCRIPTION OF PREFERRED EMBODIMENTS

Figure 1:
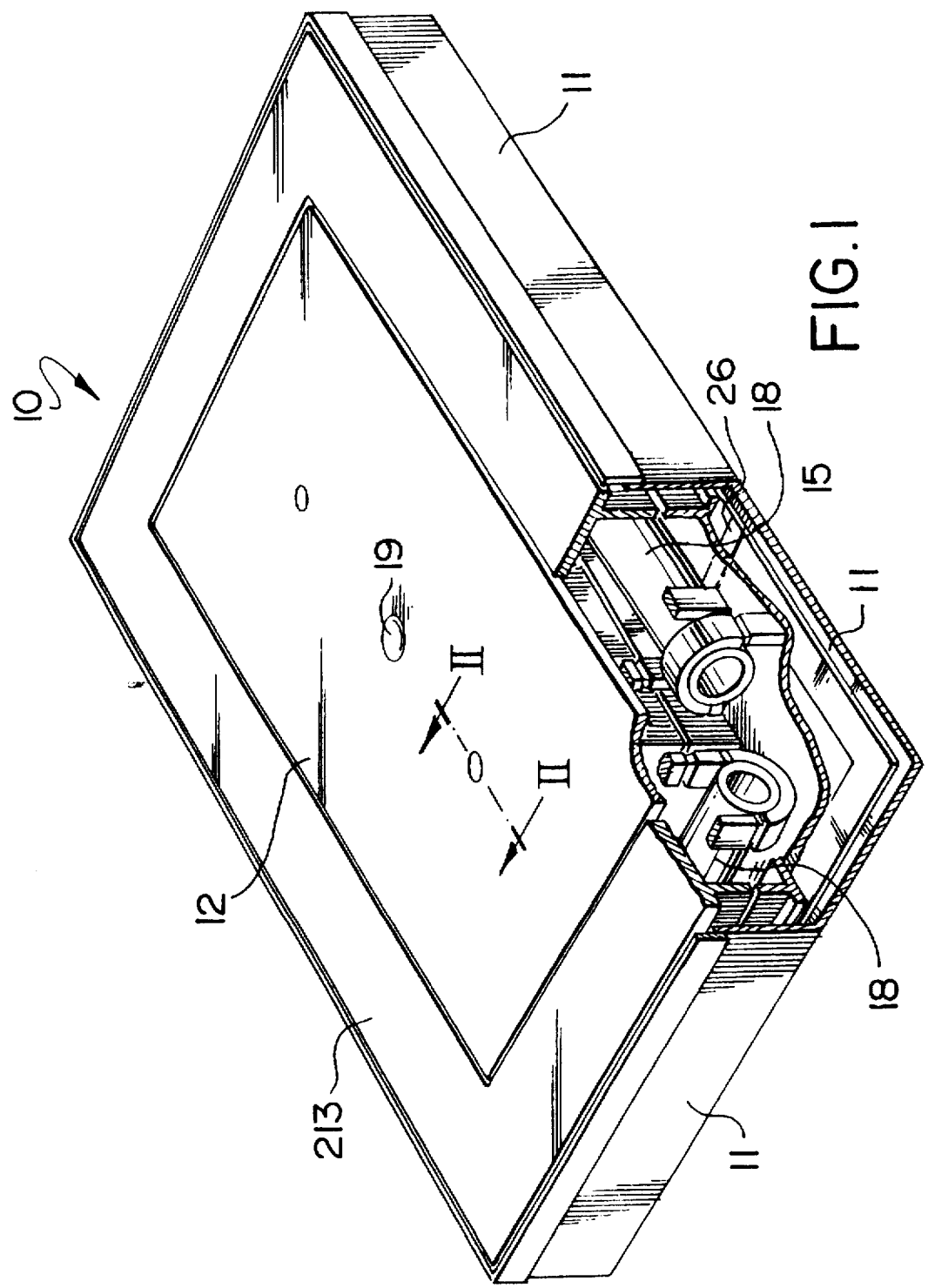
FIG. 1 is a perspective view of the weigh scale of one embodiment of the invention showing the torque-transmitting tubular arms in position within the fixed rectangular frame, the central rectangular load-supporting platform and the central load-measuring device and showing one conventional form of mounting means for the torque-transmitting tubular arms.
Figure 3:
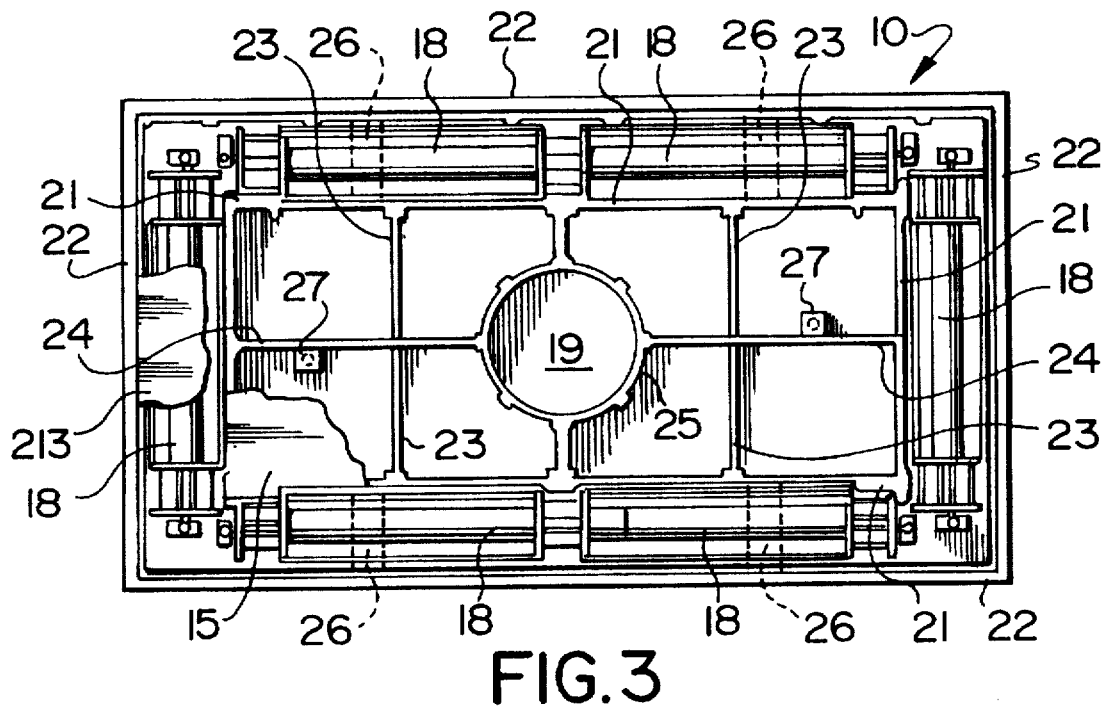
FIG. 3 is a plan view looking down on the mounting frame showing the lower, outer, fixed peripheral frame with the torque-transmitting arms and the mounting pads for securing bolts.
Figure 4:
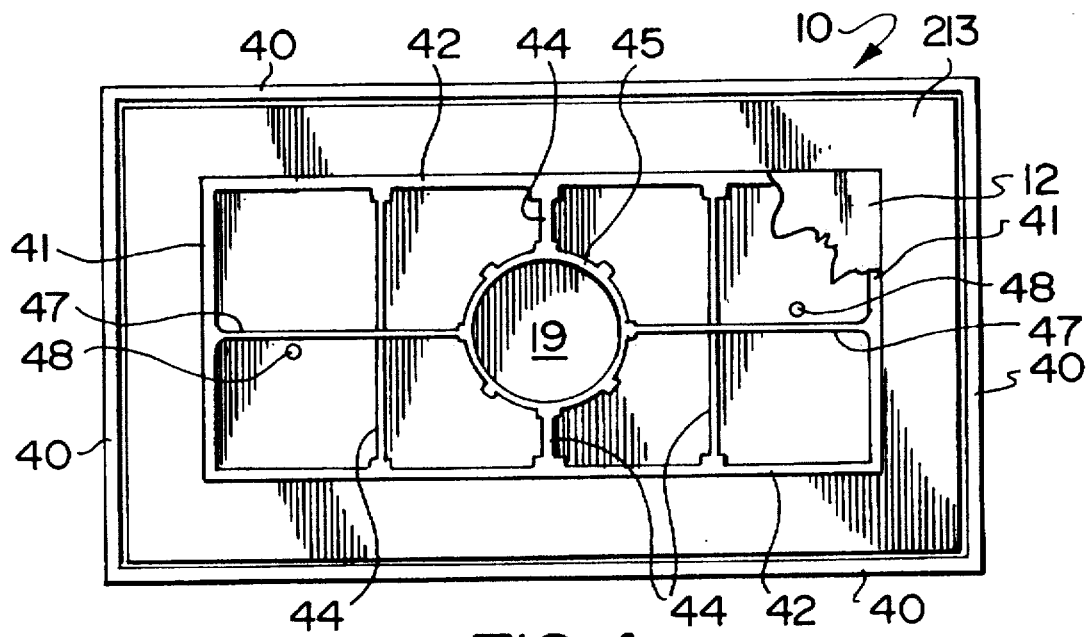
FIG. 4 is a plan view looking upwardly at the fixed, upper, outer peripheral frame and the inner, lower central, movable, load-supporting platform.

(a) Description of FIGS. 1, 3 and 4

As seen in FIG. 1, FIG. 3 and FIG. 4, one embodiment of this invention is a weigh scale 10 having a fixed mounting frame 11. A central lower frame is an integral part of the fixed mounting frame 1, an outer upper peripheral frame member 13, and an outer lower frame member 14. Rectangular frame base 15 is an integral part of the outer lower frame 14. A central movable scale platform 12 is situated within the fixed mounting frame 11. It includes an inner upper platform 16, and an inner lower platform 17. The central movable scale platform 12 is provided with a central load measuring device 19. The upper outer frame 13 and the lower outer frame 14, along with the inner upper plate 16 and inner lower plate 17, provide a nest for four torque-transmitting tubular arms 18, i.e., one at each end and one along each side of the frame 11. The upper outer frame 13 along with its outer upper frame cover 213 is secured to the lower outer frame 14, as by bolts (not shown). The torque-transmitting tubular arms 18 are operatively associated between the outer upper frame member 13, the outer lower frame member 14 and the central, movable, platform, i.e., the central, inner, upper platform 16 and the central, inner, lower platform 17 by a suitable mounting means. One such suitable mounting means is the one disclosed and claimed in U.S. Pat. No. 4,064,955 and shown in FIG. 1. Another such suitable mounting means is the one disclosed and claimed in U.S. Pat. No. 4,386,671 and shown in FIG. 2. The central load measuring device 18 may be any conventional load measuring cell, e.g. that disclosed and claimed in the Canadian Patent 1,173,069. Such cell is disposed between the central, movable platforms 16,17 and the outer frame member 13,14. A load on the central, movable platforms 16,17 transmits force in a manner now well known, and that force is translated to weight.

(b) Description of FIG. 3

As seen in FIG. 3, the central, lower frame pad 12 of the lower mounting frame 11 supports the upper outer frame member 13, and the outer lower frame member 14. The lower outer frame member includes a central inner frame base 15, an outer peripheral wall 22, longitudinal ribs 23 and transverse ribs 24, fixing a central cylindrical shell 25, within which a load measuring cell 19 is disposed. The base 15 of the outer lower frame member 15 is operatively associated with the inner lower central platform 17 by a plurality of transversely-extending anti-slide plates 26. Vertical movement of the upper, inner central platform 16/lower, inner central platform 17 combination is restricted to a true vertical movement by sliding relationship with the inner forward face of the anti-slide plate 26. A pair of mounting pads 27 is disposed at transverse wall 23. The purpose of these pads will be explained hereinafter with respect to FIG. 2 and FIG. 2A.

(c) Description of FIG. 4

As seen in FIG. 4, the underside of the lower mounting frame 11 is seen, as well as the underside of the central, movable platform 17. The underside of the central, movable platform 17 includes a structural framework comprising a peripheral wall 42, longitudinal ribs 43 and transverse ribs 44, fixing a central cylindrical shell 45, within which the load measuring cell 19 is disposed. At the intersection of each end of the peripheral wall 42 and transverse rib 43 is a bore 48.

Figure 2:
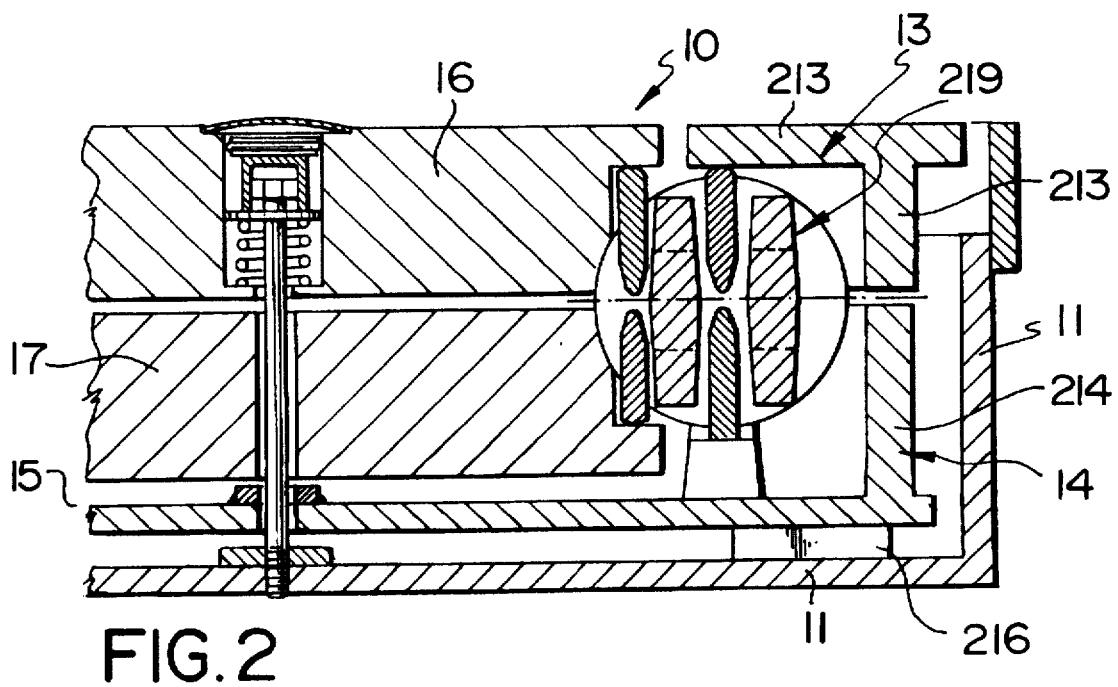
FIG. 2 is a section along the line II—II of FIG. 1 showing the restraint system of an embodiment of the present invention and also showing, in section, a second conventional form of mounting means for the torque-transmitting tubular arms.
Figure 2A:
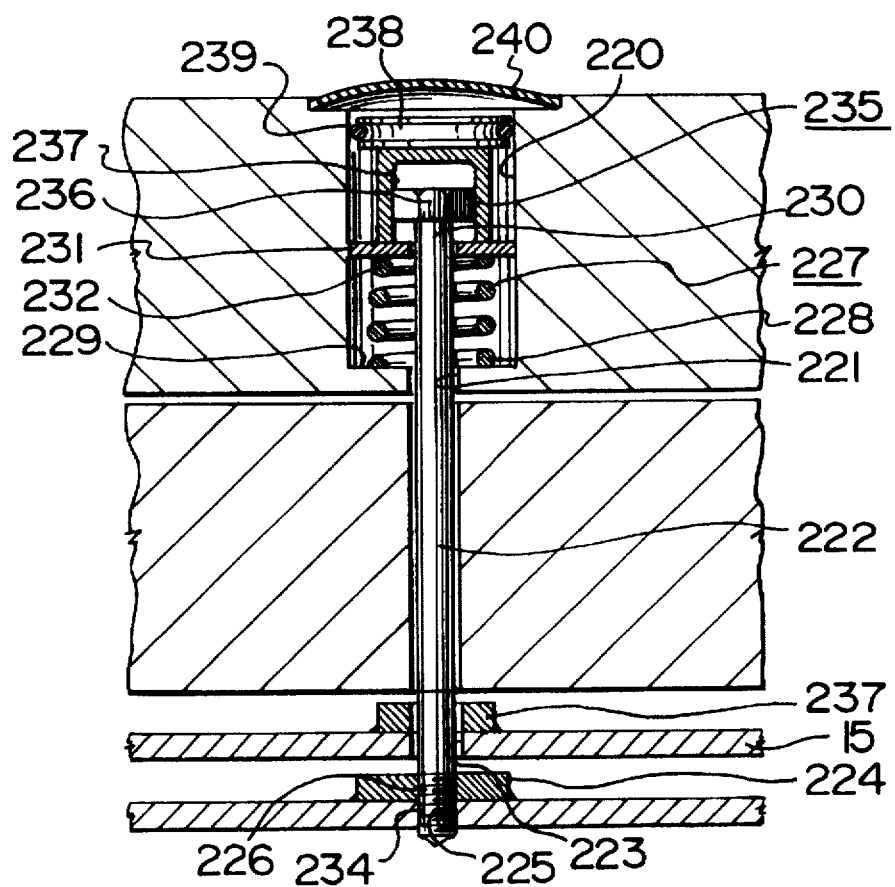
FIG. 2A is an enlarged view of the restraint system shown in FIG. 2.

(d) Description of FIGS. 2 and 2A

As seen in FIGS. 2 and 2A, the lower mounting frame 11 supports an inner weigh scale. The inner weigh scale includes an outer upper frame member 13 having a depending peripheral wall 213. It also includes an outer lower frame member 14, having an upstanding peripheral wall 214, having an inner central frame base 15 integral therewith. The outer lower frame member 14 is supported on a plurality of bearing pads 216. Outer upper frame member 13 is held to outer lower frame member 14 by conventional means (not shown).

As noted hereinbefore, the scale platform is constituted by an inner upper platform 16 and by an inner lower platform 17. The peripheral frame combination of outer upper frame member 13 and outer lower frame member 14 is secured to the scale platform combination of the inner upper platform 16 and the inner lower platform 17 by four peripheral torque transmitting bars 18, the mounting means being depicted as 219.

One embodiment of the restraint system of this invention will now be described with reference to FIGS. 2 and 2A. The inner upper platform 16 is provided with a dead-end, cylindrical bore 220 and a through-hole 221 at the base thereof. Inner lower platform 17 is also provided with an aligned through-hole 222. Central rectangular base 15 is likewise provided with an aligned through-hole 223. Finally, central lower frame pad 11 is provided with a mounting pad 224 and with an aligned-tapped through-hole 225. Mounting pad 224 is also provided with an aligned-tapped through-hole 226.

A compression spring 227 is fitted within dead-end cylindrical bore 220 with its bottom end 228 resting in the floor 229 of the dead-end cylindrical bore 220. A securing bolt 230 passes through a washer 231 which abuts the upper end 232 of spring 227 and then through the through-holes 221 and 222. Securing bolt 230 then passes through bearing washer 237 and through-hole 223. The lower threaded end 234 of bolt 230 is then threaded into tapped apertures 226,225.

Two such restraining systems are provided one each at location 27 (as seen in FIG. 3). In order to protect the restraining system, a protective cap 235 is provided atop the head 236 of the securement bolt 230. The protective cap 235 includes a cylindrical member surmounted by a disc 238 having a peripherally-mounted sealing O-ring 239. The O-ring 239 is adapted to be a sealing relation with the inner surface of the dead-end, cylindrical bore 220. A frost cap 240 is finally secured over the opening of the dead-end cylindrical bore 220.

Thus, the scale platform is secured to mounting frame against a predefined controlled resistance of the compression spring.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A weigh scale comprising:
   (A) a frame assembly which includes:
      (i) a fixed outer peripheral rectangular frame, said fixed outer peripheral rectangular frame having an outer upper frame member a lower base frame member, an outer lower frame member which is integral with said lower base frame member, and
      (ii) a mounting frame, and a central rectangular movable platform, said central movable platform comprising a central inner upper platform and a central inner lower platform, an interconnection assembly for interconnecting said fixed outer peripheral rectangular frame to said central rectangular movable platform,
      (iii) said interconnection assembly including four torque-transmitting arms, one of said torque-transmitting arms being located at each end and along each side of said fixed outer peripheral rectangular frame, a mounting assembly for mounting said torque-transmitting arms between said outer upper frame member and said outer lower frame member and between said central inner upper platform and said central inner lower platform, and
      (iv) a central load measuring device provided in said central movable scale platform,
   said weigh scale further comprising:
   (B) a securing system for securing said central movable platform to said fixed outer, peripheral frame and to said mounting frame, said securing system including:
- a first through-hole passing through said central inner lower platform;
- a second through-hole passing through said outer lower frame member, said second through-hole being aligned with said first through-hole; and
- at least one securing element having a dead-end cylindrical bore extending downwardly from the upper face of said central inner upper platform, a first hole piercing the bottom of said dead-end cylindrical bore, a compression spring seated within said dead-end cylindrical bore a third through-hole passing through said compression spring, said third through-hole being aligned with said first through-hole and with said second through-hole, and a securing bolt disposed within said dead-end cylindrical bore and threadably secured to said mounting frame, said securing bolt passing concentrically through said third through-hole, through said compression spring, through said first through-hole and through said second through-hole.

2. The weigh scale of claim 1, wherein said fixed outer peripheral rectangular frame includes said outer upper frame member, and said outer lower frame, and wherein said fixed outer peripheral rectangular frame also includes a plurality of bearing pads, said bearing pads being disposed between said lower base frame member and said mounting frame.

3. The weigh scale of claim 1, further including a mounting pad which is fixed to said mounting frame, and wherein said securing bolt is also threadably attached to said mounting pad.

4. The weigh scale of claim 1, wherein said securing bolt includes a head which is covered by a sealing cap, said sealing cap including a peripheral O-ring for engagement with an interior wall of said dead-end cylindrical bore.

5. The weigh scale of claim 4, wherein said dead-end cylindrical bore includes an entry which is fitted with a frost plug seal.

6. The weigh scale of claim 1, wherein said frame assembly further includes a plurality of transversely-extending anti-slide plates which operatively associate said lower base frame member and said central inner lower platform.

7. The weigh scale of claim 1, which includes a plurality of said securing systems.

* * * * *